W. BUSHNELL.
Manufacture of Iron and Steel.

No. 152,326.  Patented June 23, 1874.

Attest.
Mortimer Bushnell
Theodore D. Bushnell

Inventor:
William Bushnell

UNITED STATES PATENT OFFICE.

WILLIAM BUSHNELL, OF NEW YORK, N. Y.

IMPROVEMENT IN THE MANUFACTURE OF IRON AND STEEL.

Specification forming part of Letters Patent No. 152,326, dated June 23, 1874; application filed March 18, 1874.

*To all whom it may concern:*

Be it known that I, WILLIAM BUSHNELL, of the city, county, and State of New York, have discovered and invented an Improvement in the Manufacture of Iron and Steel.

This invention relates to that class of processes in the manufacture of iron and steel wherein iron ores and other oxygen-bearing substances are used as decarbonizing agents, and for converting crude iron into wrought-iron and into steel, and is, in some respects, similar to the plan and process described in my specification filed in the Patent Office January 14, 1874, and for which Letters Patent have been granted me.

In that specification I described certain iron vessels and molds lined with wood, in which I commingle and mix together molten crude iron and granulated or pulverized iron ore for the purpose of decarbonizing and converting such crude iron into wrought-iron and into steel.

In this my present invention I do not use iron vessels at all, but use, simply, wooden boxes or molds embedded in sand, clay, or other earthy material, and in such boxes or molds so embedded I commingle and mix together granulated or pulverized iron ore or other decarbonizing substance and molten crude iron direct from a blast-furnace hearth, or remelted pig-iron from a cupola-furnace, in similar manner and for like purpose as described in my aforesaid specification; and the following is hereby declared to be a full and clear description of my present invention, reference being had to the accompanying drawing making a part and parcel of this specification, in which—

Figure 1:
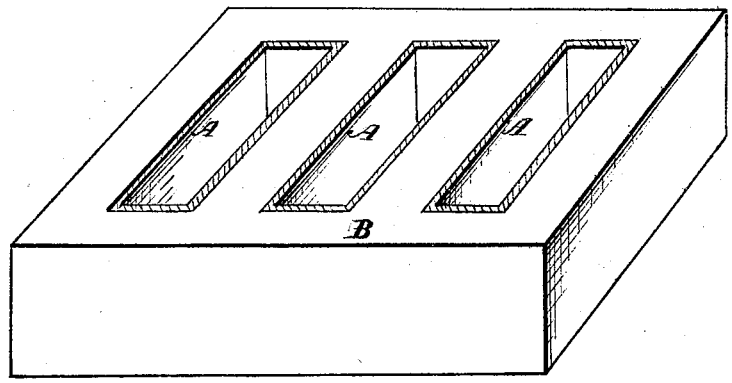
Figure 2:
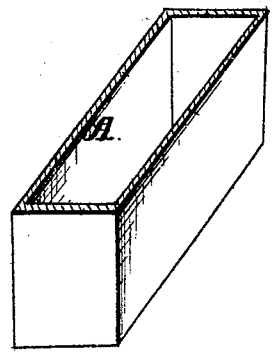

Figure 1 represents three wooden boxes, letters A A A, sixteen inches long, six inches wide, and twelve inches deep, embedded in sand, letter B, to their upper edges. Fig. 2 represents a single box of like dimensions, ready for sinking or embedding in like manner. These boxes, for convenience of description, I call "ingot-molds."

Similar letters indicate corresponding parts in the drawings.

These ingot-molds may be made of boards of any desired thickness, and may be made of any size, form, or shape required to meet general or special cases, the form and size represented in the drawing being given simply to suggest a weight of iron convenient for handling, reheating, and rolling. The aim and object of using wooden ingot-molds are the same as stated in my specification hereinbefore referred to, to wit, to maintain, or to assist in maintaining, the temperature of the molten crude iron while it is acting upon, reducing, and deoxidizing the iron ore commingled with it, and consequently to facilitate the decarbonization and conversion of the crude iron into wrought-iron and into steel.

In carrying out my process in a blast-furnace, I prepare a sufficient number of the wooden ingot-molds to receive and contain the quantity of molten crude iron proposed to be drawn from the furnace-hearth at a given time, and embed them in sand, loam, or clay, as near to the hearth as convenient, and then, at the proper time, draw the liquid iron from the hearth directly into the molds, charging one at a time in regular succession as the stream of iron reaches them, and at same moment introducing and mixing with the iron in the molds such quantity of pulverized or granulated iron ore or other decarbonizing substance as may be necessary to convert the crude iron into wrought-iron or into steel. In sinking or embedding the ingot-molds in sand, loam, or other earthy substance, for the above purpose, care must be taken to have a sufficient quantity of such substance well rammed between and around them to withstand the pressure of the iron in case the molds burn away before the iron chills.

In carrying out my process in a cupola-furnace, using remelted pig-iron, I embed or sink the wooden ingot-molds in sand, loam, or other earthy material, upon the furnace-floor, in same manner above described, and run the liquid iron directly into them by means of a wooden-lined gutter or spout, or convey it to them in iron ladles lined with wood; or, in case I desire to draw the molten iron directly from the cupola spout or outlet into the molds, I then use a car or truck having upon it a sheet or plate iron body or box of sufficient dimensions to hold and contain the desired number of the wooden ingot-molds, properly embedded in sand or loam, and so arrange the car or truck upon a track that the molds it contains may be brought under the spout or outlet of the cupola for receiving the charge of liquid iron, and at same time receive the proper proportion and mixture of granulated or pulverized iron ore, or other oxygen-bearing or decarbonizing substance, for the purpose hereinbefore set forth.

In order to protect the surface of the molten iron from the atmosphere while it is in its liquid state in the molds, I make the molds a few inches deeper than is requisite to contain the charge of iron, thereby causing the flame arising from the burning of the wood to converge over and envelop the surface of the iron while the process is going on.

Having thus described my invention, what I claim as new, and for which I desire to secure Letters Patent, is—

1. The wooden boxes or ingot-molds embedded in sand, loam, clay, or other earthy substances, upon the floor or in the pig-bed of a blast-furnace, as and for the purposes hereinbefore set forth.

2. Wooden boxes or ingot-molds embedded in sand, loam, clay, or other earthy material, within the body or box of a car or truck, as and for the purposes herein set forth.

WILLIAM BUSHNELL.

Witnesses:
MORTIMER BUSHNELL,
THEODORE D. BUSHNELL.